United States Patent [19]
Aoki et al.

[11] Patent Number: 5,836,270
[45] Date of Patent: Nov. 17, 1998

[54] ROTATING APPARATUS AND HEATING APPARATUS FOR VEHICLE

[75] Inventors: Shiniji Aoki, Kariya; Hikaru Sugi, Nagoya; Hajime Ito, Kariya; Toshio Morikawa, Toyota, all of Japan

[73] Assignee: Denso Corporation, Kariya, Japan

[21] Appl. No.: 886,667

[22] Filed: Jul. 1, 1997

[30] Foreign Application Priority Data

Jul. 2, 1996 [JP] Japan .................................. 8-172605

[51] Int. Cl.$^6$ .............................. F01P 3/12; B60H 1/00
[52] U.S. Cl. ............................ 123/41.31; 237/12.3 R; 123/142.5 R
[58] Field of Search .............................. 122/26; 126/247; 123/142.5 R, 41.31; 237/12.3 R

[56] References Cited

U.S. PATENT DOCUMENTS

| | | | |
|---|---|---|---|
| 4,424,797 | 1/1984 | Perkins | 126/247 |
| 4,739,204 | 4/1988 | Kitamura et al. | 123/41.31 |
| 4,765,283 | 8/1988 | Kitamura et al. | 123/41.31 |
| 4,922,148 | 5/1990 | Kitamura . | |
| 4,993,377 | 2/1991 | Itakura . | |
| 5,040,493 | 8/1991 | Gajewski et al. | 123/41.31 |
| 5,655,485 | 8/1997 | Kusase et al. | 123/41.31 |

FOREIGN PATENT DOCUMENTS

| | | |
|---|---|---|
| A-3-57877 | 3/1991 | Japan . |
| A-4-4736 | 1/1992 | Japan . |

*Primary Examiner*—Erick R. Solis
*Attorney, Agent, or Firm*—Harness, Dickey & Pierce, PLC

[57] ABSTRACT

A heat recovery unit in which cooling water absorbs heat generated in a water-cooled alternator and a viscous heater in which cooling water absorbs heat generated in a viscous fluid within a heat-generating chamber have a common cooling water passage. Further, a rotor of the alternator and a rotor of a viscous heater are disposed on a shaft to have a common driving shaft and a common V-belt. Therefore, cooling water pipes of a cooling water circuit are simply connected, a large space is not necessary for winding the V-belt of a belt transmitting mechanism, and the number of parts of a heating apparatus can be decreased. Further, because heat generated in the viscous fluid of the viscous heater and heat generated with an operation of the alternator are used as a supplementary heating source, a sufficient heating capacity can be provided for a passenger compartment even in a vehicle in which heat generated in the engine is small.

17 Claims, 8 Drawing Sheets

ROTATING APPARATUS AND HEATING APPARATUS FOR VEHICLE

CROSS-REFERENCE TO RELATED APPLICATION

This application is related to and claims priority from Japanese Patent Application No. Hei. 8-172605 filed on Jul. 2, 1996, the contents of which are hereby incorporated by reference.

BACKGROUND OF THE INVENTION

1. Field of the Invention

The present invention relates to a water-cooled rotating apparatus using engine cooling water as coolant, and a heating apparatus for a vehicle, in which heat generated in viscous fluid of a heat-generating unit using a shearing force and heat generated with an operation of an alternator are used as a supplementary heating source to heat a passenger compartment of the vehicle.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment of the vehicle.

However, in a case of a vehicle in which heat generated in the engine is too small to heat the cooling water with engine sufficiently, such as a vehicle having a diesel engine or a lean burn engine, because a temperature of cooling water in a cooling water circuit cannot be maintained at a predetermined temperature (e.g., 80° C.), there occurs a problem in that a heating capacity for the passenger compartment is insufficient.

To overcome such a problem, as disclosed in U.S. Pat. No. 4,993,377 and JP-A-3-57877, the following heating apparatus for a vehicle is conventionally proposed. In the heating apparatus for a vehicle, a heat-generating unit using a shearing force, for heating cooling water to be supplied to a heater core, is disposed in a cooling water circuit, and the heat-generating unit is operated to improve the heating capacity for the passenger compartment when the cooling water temperature is less than a set temperature.

The heat-generating unit transmits a rotational force of the engine to a shaft through a belt transmitting mechanism and the electromagnetic clutch. A heat-generating chamber is formed in a case of the heat-generating unit, and a cooling water passage is formed at an outer periphery of the heat-generating chamber. A rotor which rotates integrally with the shaft is disposed in the heat-generating chamber, and a shearing force generated by a rotation of the rotor is applied to viscous fluid such as silicon oil sealed in the heat-generating chamber to generate heat. The cooling water circulating in the cooling water passage is heated by the generated heat.

Recently, as an electric load for a vehicle is increased and an engine compartment becomes small, it is desirous that an alternator has a small size and a high power. To effectively cool the alternator having the high power, cooling water from the engine is introduced to a cooling water passage formed in an alternator (i.e., AC generator) as described in JP-A-4-4736 and U.S. Pat. No. 4,922,148.

Here, a heating apparatus can be considered in that heat generated in the heat-generating unit using a shearing force and heat generated with an operation of the alternator are used as a supplementary heating source to heat the passenger compartment. However, in the heating apparatus for a vehicle, a rotational shaft of the water-cooled alternator is connected to a pulley attached to a crank shaft of the engine through a belt and a pulley, and a shaft of the heat-generating unit is connected to a pulley attached to the crank shaft of the engine through a belt and an electromagnetic clutch.

In the heating apparatus for a vehicle, the pulley for driving the shaft of the heat-generating unit using the shearing force and the pulley for driving the rotational shaft of the alternator are separately formed, so that a rotational force of the engine is respectively transmitted to the shaft of the heat-generating unit using the shearing force and the rotational shaft of the alternator through the respective pulley and the belt. Thus, when the heat-generating unit using the shearing force and the alternator are simply connected, a large space is necessary for installing the belt, and therefore there is a problem in that an installation performance of the heating apparatus to the vehicle is deteriorated.

Further, in the heating apparatus for a vehicle, a cooling water passage in the heat-generating unit using the shearing force and a cooling water passage in the alternator are separately formed, and heat generated in the heat-generating unit using the shearing force and heat generated with an operation of the alternator are used as a supplementary heating source to heat the passenger compartment. Therefore, cooling water pipes for connecting the cooling water passage of the heat-generating unit to the cooling water circuit and cooling water pipes for connecting the cooling water passage of the alternator to the cooling water circuit are necessary, and the installation of the cooling water pipes becomes complex, thereby the installation performance of the heating apparatus to the vehicle is extremely deteriorated.

As the supplementary heating source, only the heat generated with the operation of the alternator may be used. However, when a directly injected type diesel engine is used or heat generated in the engine is further decreased, the heating source is too small to heat the passenger compartment even if the heat generated in the engine and the heat generated in the alternator are added, so that the heating capacity for the passenger compartment is insufficient.

SUMMARY OF THE INVENTION

In view of the foregoing problems of the prior art, it is an object of the present invention to provide a rotating apparatus for a vehicle and a heating apparatus for a vehicle, which have an improved installation performance on a vehicle and decreased number of parts by using a common driving shaft or a common cooling water passage.

Further, it is another object of the present invention to provide a heating apparatus for a vehicle, which has improved heating capacity by using a heat generated in a viscous fluid in a heat-generating unit using a shearing force and a heat generated with an operation of an electric device as a supplementary heating source.

According to a first aspect of the present invention, a rotating body of a rotating unit is disposed on the same shaft as a rotor of a heat-generating unit using a shearing force, and the rotating body of the rotating unit and the rotor of the heat-generating unit rotate when a driving force of a driving source unit of a vehicle is applied thereto through a common driving shaft. Therefore, the number of parts of driving means for connecting the rotor of the heat-generating unit and the rotating body of the rotating unit to the driving source unit can be decreased. As a result, a large space for winding the driving means is not necessary, and an installation performance of a rotating apparatus to a vehicle can be improved.

According to a second aspect of the present invention, in the heating apparatus for a vehicle, thermal medium to be supplied to a heating heat exchanger from a heating source is heated by heat generated in viscous fluid of a heat-generating unit using a shearing force and heat generated with an operation of an electric device of a heat recovery unit. That is, because heat generated in the heat-generating unit and the electric device is used as a supplementary heating source, the heating capacity for a passenger compartment can be improved. Further, because the heat-generating unit and the heat recovery unit have a common thermal medium passage, thermal medium pipe for connecting the heating source and the heating heat exchanger through the thermal medium passage has a simple structure so that an installation performance of the heating apparatus to a vehicle can be improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described.

Figure 1:
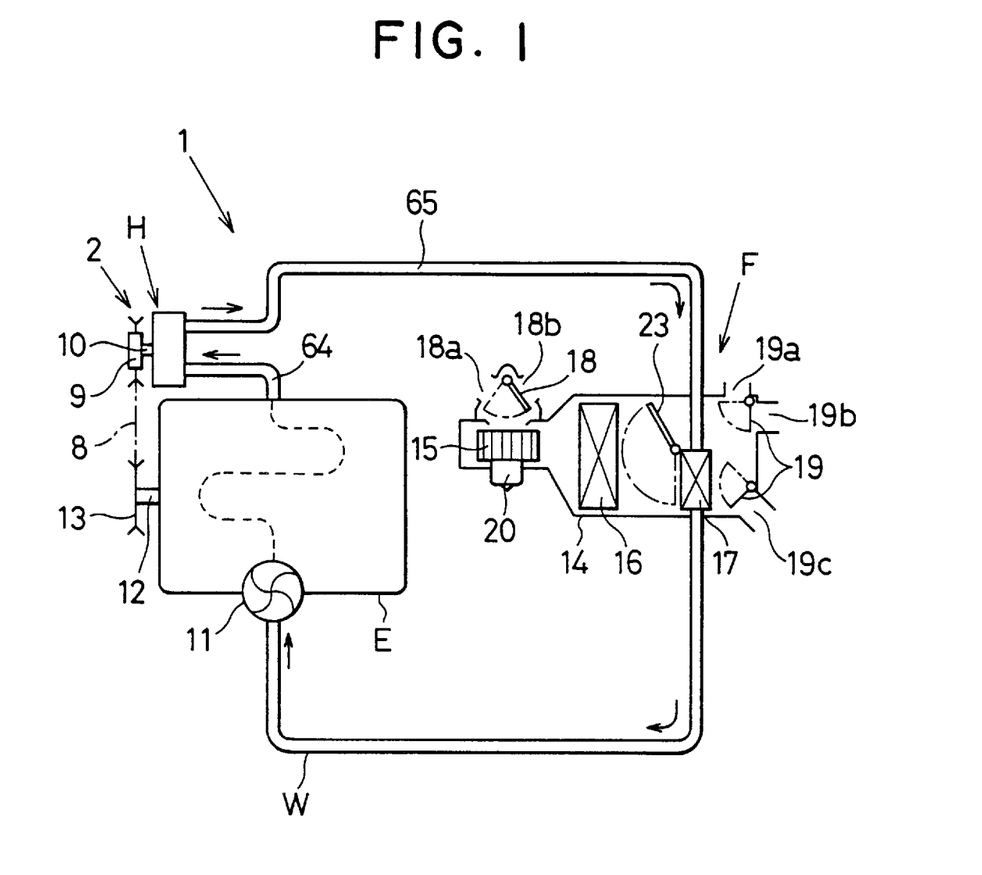
FIG. 1 is a schematic diagram showing an entire construction of an air-conditioning apparatus for a vehicle according to a first preferred embodiment of the present invention.

As shown in FIG. 1, an entire system 1 for a vehicle is equipped with a water-cooled diesel engine E (hereinafter referred to as "engine") disposed in an engine compartment of a vehicle, an air-conditioning unit F for air-conditioning of a passenger compartment, a belt transmitting mechanism 2 connected to and driven by the engine E, a supplementary heating source unit H for heating cooling water for cooling the engine E, an engine control unit (not shown) for control the engine E and an air-conditioning control unit (not shown) for controlling the air-conditioning unit F.

The engine E as a driving source is disposed within a cooling water circuit W in which cooling water circuits, and is provided with a water jacket therearound. A water pump 11 for compulsorily pumping the cooling water is disposed in a cooling water circuit W. Further, a crank pulley connected to the belt transmitting mechanism 2 is attached to a crank shaft (i.e., output shaft) 12 of the engine E. As the cooling water, antifreeze solution such as ethylene glycol aqueous solution or a mixed coolant may be used. Further, instead of the cooling water, a cooling solution such as oil as a thermal medium may be used.

The air-conditioning unit F includes a duct 14, a blower 15, an evaporator 16 of a refrigerant cycle, a heater core 17 of the cooling water circuit W and the like. At an upstream air side of the duct 14, there is rotatably provided an inside/outside air switching door 18 for selectively opening and closing an outside air inlet 18a and an inside air inlet 18b to switch an air inlet mode. At a downstream air side of the duct 14, there is rotatably provided an air mode switching door 19 for selectively opening and closing a defroster air outlet 19a, a face air outlet 19b and a foot air outlet 19c to switch an air outlet mode. The blower 15 is driven by a blower motor 20 to generate an air flow toward the passenger compartment in the duct 14.

The evaporator 16 is used as cooling means (i.e., refrigerant evaporator) for cooling air flowing in the duct 14. The refrigerant cycle includes the evaporator 16, a compressor 21, a condenser (i.e., a refrigerant condenser), a receiver (i.e., gas-liquid separator), an expansion valve (i.e., decompressing means). When a rotational force of the engine E is applied to the compressor 21, the compressor 21 compresses refrigerant sucked from the evaporator 16 and discharges the compressed refrigerant toward the condenser. A V-pulley 22 connected to and driven by an output shaft of the compressor 21 is connected to the crank pulley 13 of the engine E through a V-belt of the belt transmitting mechanism described later.

The heater core 17 as a heating heat exchanger is disposed in the duct 14 at a downstream air side (i.e., downwind side) of the evaporator 16 and is connected to the cooling water circuit W at a downstream side of the supplementary heating source unit H with reference to the flow direction of the cooling water. The heater core 17 heats air by heat-exchanging the air having passed through the evaporator 16 and the cooling water. At an upstream air side of the heater core 17, there is rotatably provided an air-mixing door 23. The air-mixing door 23 adjusts a ratio between an amount of air (i.e., warm air) passing through the heater core 17 and an amount of air (i.e., cool air) bypassing the heater core 17 so that a temperature of air blown into the passenger compartment can be adjusted.

The supplementary heating source unit H is used as a supplementary heating source of the engine E which is a main heating source, and generates heat when the rotational force of the engine E is transmitted to the supplementary heating source unit H through the belt transmitting mechanism 2. A heat recovery unit 5 for recovering heat generated with an operation of a water-cooled alternator 4 and a heat-generating unit using a shearing force (hereinafter referred to as "viscous heater") 6 are contained within a common housing 3. Further, the supplementary heating source unit H is also used as the rotating apparatus in which the water-cooled alternator and the viscous heater are integrated with each other. In the supplementary heating source unit H, the heat recovery unit 5 and the viscous heater 6 have a common cooling water passage 7.

Figure 2:
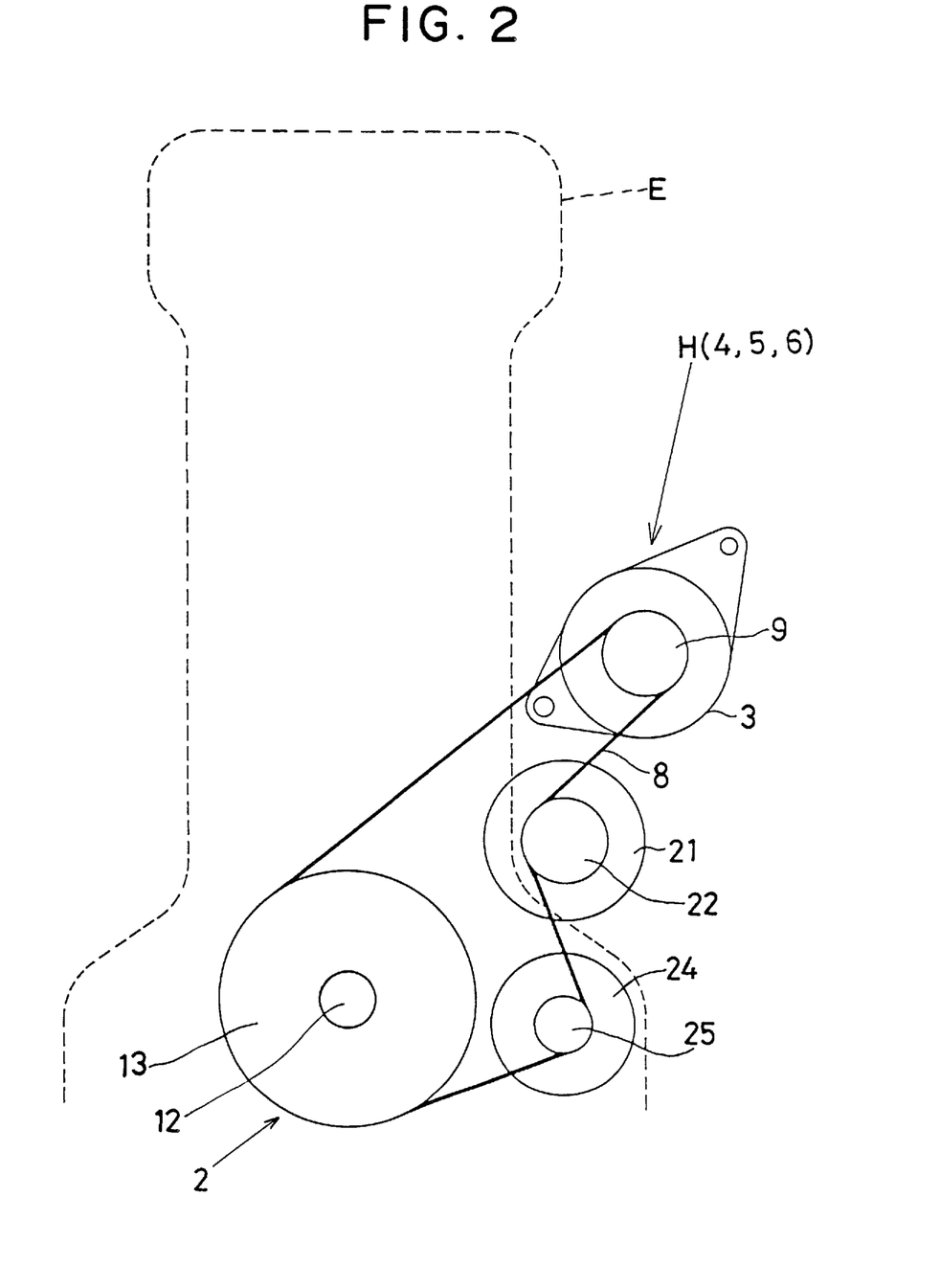
FIG. 2 is a schematic diagram showing an engine and a belt transmitting mechanism according to the first embodiment.

As shown in FIG. 2, the belt transmitting mechanism 2 includes a multi-stage type V-belt 8 connected to the crank pulley 13 of the engine E and the V-pulley 22 of the compressor 21, a V-pulley 9 of the supplementary heating source unit H, and the driving shaft 10 of the supplementary heating source unit H. The V-pulley 9 of the supplementary heating source unit H is hung on the V-belt 8 with the V-pulley 22 of the compressor 21, and the driving shaft 10 of the supplementary heating source unit H is connected to and driven by the V-pulley 22 of the compressor 21.

The V-belt 8 transmits a rotational force (i.e., driving power) of the engine E to the supplementary heating source unit H and the compressor 21. Further, a V-pulley 25 of a supplementary unit (e.g., a pump for pumping a lubricating oil of the engine E) of the engine E is also hung on the V-belt 8. A pulley of a water pump 11 may be hung on the V-belt 8.

Figure 3:
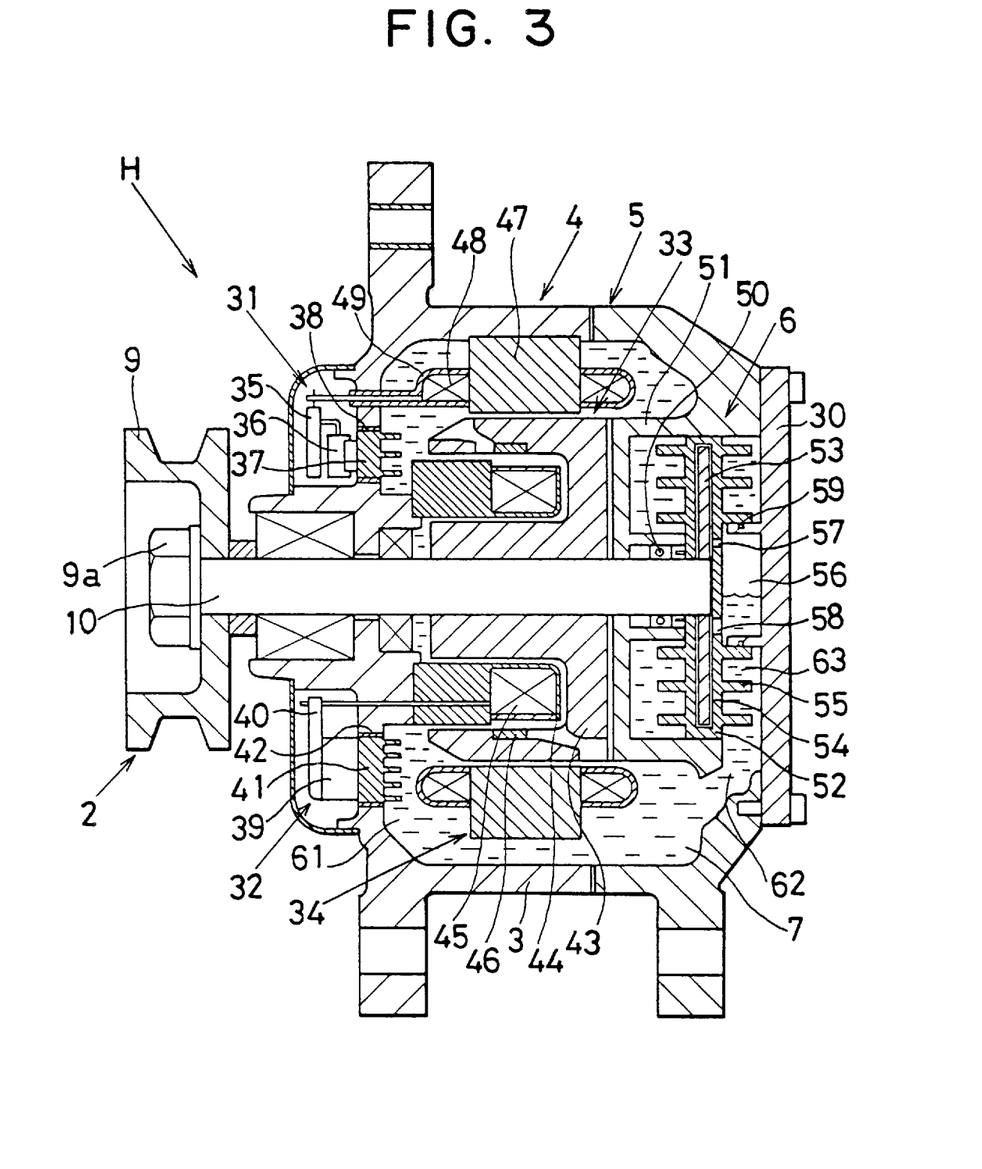
FIG. 3 is a cross-sectional view showing a supplementary heating source unit for heating according to the first embodiment.

The driving shaft 10 is used as a common shaft for the alternator 4 and the viscous heater 6 as shown in FIG. 3. The V-pulley 9 is fixedly fastened to a top end portion of the driving shaft 10 by a fastening member 9a. Clutch means such as an electromagnetic clutch may be disposed between the driving shaft 10 and the V-pulley 9 of the supplementary heating source unit H. The driving shaft 10 may be directly connected to an output shaft such as the crank shaft 12 of the engine E. Further, a gear transmission having at least one stage gear or a V-belt type non-stage transmission may be connected between the driving shaft 10 of the supplementary heating source unit H and the output shaft of the engine E.

The alternator 4 is driven by the engine E through the belt transmitting mechanism 2. AC power generated in the alternator 4 is rectified to DC power in a three-phase rectifying device 31 so that the rectified DC power is supplied to a battery (not shown) attached in the vehicle and an electric device (electric load) of the vehicle. A voltage regulator 32 for regulating output electric voltage is installed in the alternator 4. Further, the alternator 4 is a brush-less type alternator having a rotor 33 rotating integrally with the driving shaft 10 and a stator 34 disposed at an outer periphery side of the rotor 33.

The three-phase rectifying device 31 includes a AC input terminal 35 for inputting AC power from a stator coil of the stator 34, a plurality of diodes 36 for rectifying the alternating current input from the terminal 35 to a direct current, and a cooling fin 37 for water-cooling the diodes 36. The cooling fit 37 is made of metal having a sufficient heat conductivity, and is held in an inner wall portion of the housing 3 through a seal member 38 having an insulation performance and a sufficient sealing performance. Instead of the cooling fin 37, recess portions and protrusion portions, or a heat-transmission facilitating member such as corrugated fins and pin fins may be formed on an wall surface of a base supporting the diodes 36.

The voltage regulator 32 includes an electric part 39 such as a contact type regulator or a AC regulator, an exciting current output terminal 40 for outputting exciting current to a field coil of the rotor 33 described later, and a cooling fin 41 for water-cooling the electric part 39. The cooling fin 41 is made of metal having a sufficient heat conductivity, and is held in an inner wall portion of the housing 3 through a seal member 42 having an insulation performance and a sufficient sealing performance. Instead of the cooling fin 41, recess portions and protrusion portions, or a heat-transmission facilitating member such as corrugated fins and fine pin fins may be formed on an wall surface of a base supporting the electric part 39.

The rotor 33 is fixed at a center portion of the driving shaft 10. The rotor 33 includes a pole core 43 having a pare of claw-shaped pole pieces and a field coil 45 wound in a coil bobbin 44. A coil end of the field coil 45 is electrically connected to the exciting current output terminal 40 of the voltage regulator 32 or DC output terminal (not shown) by using soldering means.

When an exciting current is supplied to the field coil 45 through the exciting current output terminal 40 of the voltage regulator 32, a plurality of claw-shaped pole pieces at one side become N poles and a plurality of claw-shaped pole pieces at another side become S poles. The coil bobbin 44 electrically insulates the housing 3, the pole core 43 and the field coil 45, and is water-tightly formed to have a sufficient heat transmission performance. A pair of the claw-shaped pole pieces are connected through a circular connection member 46 made of non-magnetic material. A permanent magnet may be attached in the pole core 43.

The stator 34 includes a stator core 47 fixed on the inner wall surface of the housing 3 and three-phase stator coils 48 wound around the stator core 47. The three-phase stator coil 48 is a Y-connected or a Δ-connected armature winding. A coil end of the stator coil 48 is electrically soldered to the AC input terminal 35 of the three-phase rectifying device 31, and is water-tightly covered by a seal member 49 having an electric-insulation performance and a sufficient heat transmission performance.

The heat recovery unit 5 recovers exhaust heat generated with the operation of the alternator 4 to heat cooling water to be supplied to the heater core 17. The heat recovery unit 5 is a supplementary heating source of the engine which is the main heating source. The heat recovery unit 5 includes the housing 3, the water-cooled alternator 4 and the cooling water passage 7.

The viscous heater 6 is also a supplementary heating source of the engine E which is the main heating source. The viscous heater 6 includes the driving shaft 10 which is used in common with the alternator 4, a supporting member 51 for rotatably supporting the driving shaft 10 through a bearing 50, a casing 52 fixed at a rear end side of the supporting 25 member 51 and the rotor 53 rotatably disposed in the casing 52.

The supporting member 51 is formed approximately in a ring-shaped plate, and is formed integrally with an inner wall of the housing 3.

The casing 52 is made of a metallic member such as aluminum alloy having a sufficient heat conductivity. An outer peripheral surface of the casing 52 is partly connected to an inner peripheral surface of the supporting member 51. Within the casing 52, there is provided a heat-generating chamber (i.e., shearing chamber) for sealing viscous fluid (e.g., silicon oil) which generates heat when a shearing force is applied thereto. A plurality of plate-shaped fins, for efficiently transmitting heat of the viscous fluid to the cooling water, are formed integrally with the casing 52.

Instead of the plate-shaped fins 55, the outer wall surface of the casing 52 may be formed in a convex and concave shape, or a heat transmission facilitating member such as corrugated fins and fine pin fins may be formed on the outer wall surface of the casing 52. Further, a labyrinth seal may be formed between the casing 52 and the rotor 53, and may be used as the heat-generating chamber 54.

The rotor 53 is rotatably disposed in the heat-generating chamber 54 and is fixed to an outer periphery of the rear end portion of the driving shaft 10. A plurality of groove portions (not shown) are formed on an outer peripheral surface or both side wall surfaces of the rotor 53, and a protrusion portion is formed between each of the adjacent groove portions. When the rotational force of the engine E is supplied to the driving shaft 10, the rotor 53 rotates integrally with the driving shaft 10 to generate a shearing force to the viscous fluid sealed in the heat-generating chamber 54.

In the first embodiment, there is provided an oil temperature automatic-control mechanism for controlling a temperature of the viscous fluid sealed in the heat-generating chamber 54. The oil temperature automatic-control mechanism has an oil storage chamber 56 formed between the housing 3 and the casing 52. The viscous fluid is temporarily stored in the oil storage chamber 56. The oil storage chamber 56 is communicated with the heat-generating chamber 54 through an oil outlet 57 and an oil inlet formed on the casing 52. The oil outlet 57 is opened near the driving shaft 10. The oil inlet 58 is opened at a lower end side of the oil storage chamber 56. Further, a seal member 59 is attached between a rear side cover 30 and the casing 52 to prevent the viscous fluid from leaking from the oil storage chamber 56 and the cooling water from leaking into the oil storage chamber 56.

The cooling water passage 7 is constructed by a heat recovery chamber 61 for cooling heat-generating parts of the alternator 4, a communication passage 62 formed at a downstream water side of the heat recovery chamber 61, the heat recovery chamber 63 communicated with the heat recovery chamber 61 through the communication passage 62 and surrounded between a rear end portion of the housing 3, the supporting member 51 and the casing 52, and the like. An inlet port of the heat recovery chamber 61 is connected to the water jacket of the engine E through a cooling water pipe 64. Further, an outlet port of the heat recovery chamber 63 is connected to the heater core 17 through a cooling water pipe 65.

Next, an operation of the alternator 4 of the first embodiment will be described with reference to FIGS. 2 and 3.

When the engine E is driven, a rotational force of the engine E is transmitted to the driving shaft 10 through the crank pulley 13, the V-belt 8 and the V-pulley to rotate the driving shaft 10, and therefore the rotor 33 is also rotated integrally with the driving shaft 10. An exciting current is supplied to the field coil 45 by an operation of the voltage regulator 32 to magnetize the claw-shaped pole pieces of the pole core 43. That is, all claw-shaped pole pieces at one side become N poles, and all claw-shaped pole pieces at another side become S poles.

Further, alternate current is generated in the three-phase stator coil 48 wound on the stator core 47 of the stator 34 opposite to the pole core 43 of the rotor 33. The alternate current generated in the three-phase stator coil 48 is input to the plurality of diodes 36 through the AC input terminal 35 to rectify the alternate current to direct current. When a voltage generated in the three-phase stator coil 48 is more than a battery voltage, the rectified direct current is supplied to the battery through the DC output terminal to charge the battery.

Next, an operation of the entire system 1 according to the first embodiment will be described with reference to FIGS. 1 and 3.

When the engine E starts, the rotational force of the engine E is transmitted to the compressor 21 through the crank pulley 13, V-belt 8 and the V-pulley 22. Therefore, refrigerant circuits in the refrigerant cycle, air passing through the evaporator 16 in the duct 14 is cooled.

Further, the rotational force of the engine E is transmitted to the driving shaft 10 through the V-pulley 9 to rotate the driving shaft 10, and the rotor 33 of the alternator 4 and the rotor 53 of the viscous heater 6 are thereby rotated. The rotational force of the engine E is also transmitted to the water pump 11 so that cooling water heated in the engine flows from the water jacket to the cooling water passage 7 (i.e., heat recovery chamber 61) of the housing 3 through the cooling water pipe 64.

At this time, heat is generated with the operation of the alternator 4. Specifically, because an electric power is supplied to the plurality of diodes 36 of the three-phase rectifying device 31, the electric part 39 of the voltage regulator 32, the field coil 45 and the stator coil 48, heat is generated in the heat-generating parts. Therefore, cooling water circulating in the heat recovery chamber 61 of the cooling water passage 7 absorbs heat generated in the plurality of diodes 36 through the cooling fin 37, absorbs heat generated in the electric part 39 through the cooling fin 41, absorb heat generated in the field coil 45 through the coil bobbin 44, and absorbs heat generated in the stator coil 48 through the seal member 49. Thus, each heat-generating parts of the alternator 4 is cooled.

Cooling water heated in the alternator 4 flows in the heater recovery chamber 63 through the communication passage 62. At this time, because the rotor 53 is rotated integrally with the driving shaft 10 in the viscous heater 6, a shearing force is applied to the viscous fluid in the heat-generating chamber 54 to generate heat. Therefore, when cooling water flows around the casing 52, the cooling water is heated while absorbing heat generated in the viscous fluid through the plate fins 55.

The cooling water sufficiently heated by absorbing heat generated in the alternator 4 and in the viscous heater 6 is supplied to the heater core 17 through the cooling water pipe 65. Therefore, air cooled by the evaporator 16 in the duct 14 is reheated by the cooling water flowing in the heater core 17, and the reheated warm air is blown into the passenger compartment from the foot air outlet 19c mainly. Thus, the heating operation of the passenger compartment is performed with a large heating capacity.

The heating capacity of the viscous heater 6 may be set freely in advance by a viscous coefficient of the viscous fluid sealed in the heat-generating chamber 54. That is, the larger the viscous coefficient the viscous fluid has, the larger the shearing force applied by the rotation of the rotor 53 becomes. Therefore, the heat-generating capacity of the viscous heater 6 is increased, and the load and the fuel consumption rate of the engine E become larger. On the other hand, the smaller the viscous coefficient the viscous fluid has, the smaller the shearing force applied by the rotation of the rotor 53 becomes. Therefore, the heat-generating capacity of the viscous heater 6 is decreased, and the load and the fuel consumption rate of the engine E become lower.

In the first embodiment, the alternator 4 and the viscous heater 6 have the common driving shaft 10 and the common belt transmitting mechanism 2, and the rotational force of the engine E is always transmitted to the driving shaft 10. Thus, when the engine E rotates, the rotor 53 of the viscous heater 6 always rotates. As the rotational speed of the engine E is increased, the rotational speed of the rotor 53 is also increased. Because the heat-generating capacity of the viscous heater 6 is increased by increasing the rotational speed of the rotor 53, the temperature of the viscous fluid becomes high. In the first embodiment, since silicon oil having a high viscosity is used as the viscous fluid, the viscous fluid may be oxidized and deteriorated when the temperature of the viscous fluid becomes too high.

However, in the first embodiment, when the searing stress is applied to the viscous fluid, the viscous fluid in the heat-generating chamber 54 moves vertically relative to the searing stress to gather the viscous fluid at a center side of the rotation of the rotor 53, and flows into the oil storage chamber 56 through the oil outlet 57. As a result, an amount of the viscous fluid is reduced, and the temperature of the viscous fluid does not become too high. The viscous fluid flowing in the oil storage chamber 56 flows to a lower portion of the oil storage chamber 56 by the weight of the viscous fluid, and returns to the heat-generating chamber 54 through the oil inlet 58 while attaching the viscous fluid to the rotor 53.

As described above, according to this embodiment, because the heat recovery unit 5 and the viscous heater 6 are integrated so that the rotor 33 of the alternator 4 and the rotor 53 of the viscous heater 6 have the common driving shaft 10, the number of parts of the heating apparatus can be decreased as compared with a heating apparatus in which the driving shaft of the alternator 4 and the driving shaft of the viscous heater 6 are respectively provided. As a result, a large space for installing the V-belt 8 of the belt transmitting mechanism 2 is not necessary. Thus, even if an installation space for supplementary units of the engine E becomes small by downsizing the engine compartment, the alternator 4 and the viscous heater 6 are readily installed around the engine E, and therefore an installation performance of the alternator 4 and the viscous heater 6 to a vehicle can be improved.

Further, because heat generated in the alternator 4 and the viscous heater 6 is used as the supplementary heating source relative to the engine E which is the main heating source, cooling water to be supplied to the heater core 17 can be sufficiently heated. Thus, even in a vehicle in which heat generated in the engine E is too small to heat the cooling water with engine sufficiently, such as a vehicle having a diesel engine or a lean burn engine, because a temperature of cooling water in the cooling water circuit W can be maintained at a predetermined temperature (e.g., 80° C.), the heating capacity for the passenger compartment is sufficient.

Further, the alternator 4 and the viscous heater 6 have the common cooling water passage 7, and the heat recovery unit 5 and the viscous heater 6 also have the common cooling water passage 7. Therefore, by directly connecting the engine E, the heater core 17 and the cooling water passage 7 through the cooling water pipes 64 and 65, the alternator 4, the heat recovery unit 5 and the viscous heater 6 can be connected to each other. Because the cooling water pipes of the cooling water circuit W are simply connected, the cooling water circuit W of the system 1 can be readily installed in a vehicle.

Figure 4:
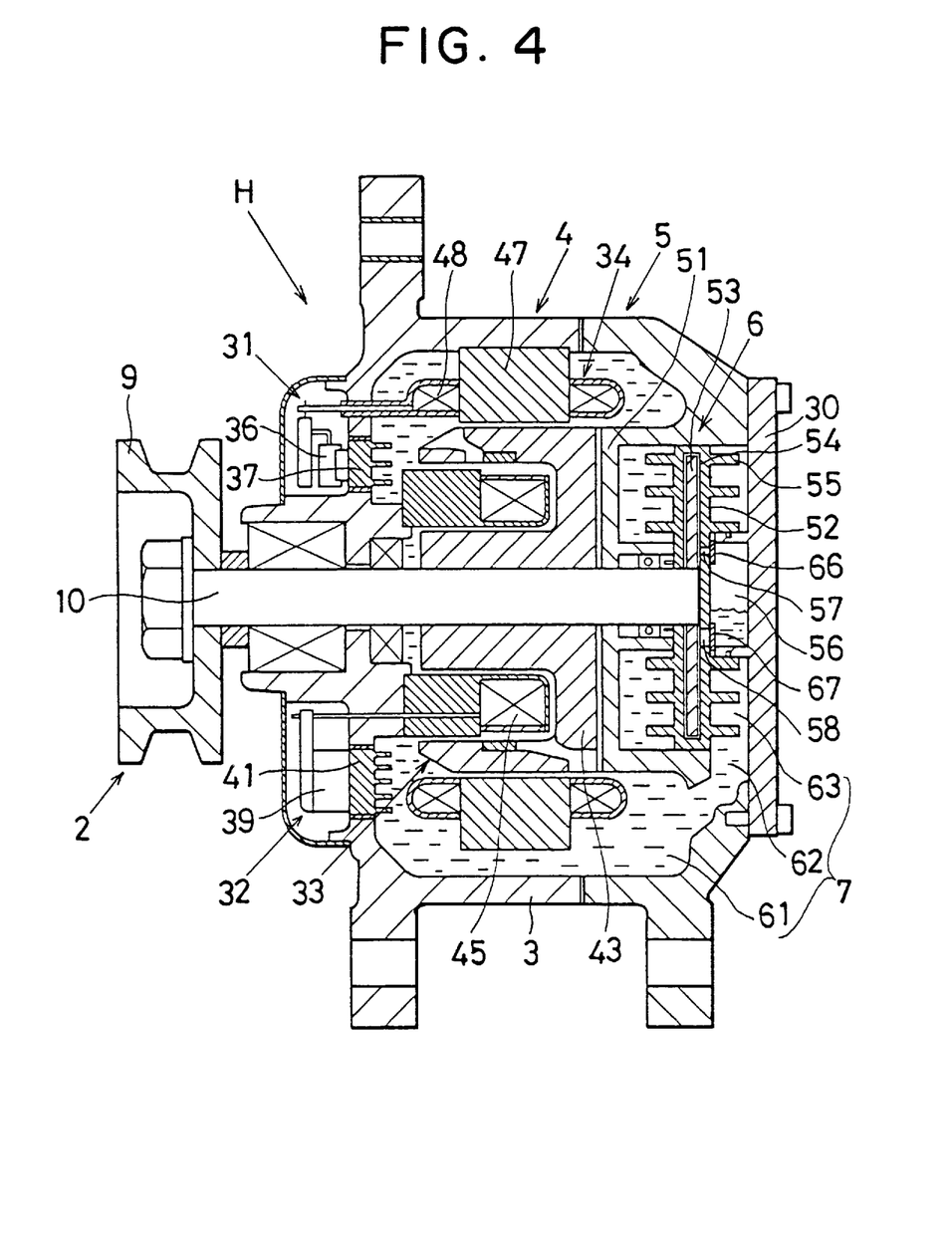
FIG. 4 is a cross-sectional view showing a supplementary heating source unit for heating according to a second preferred embodiment of the present invention.

A second preferred embodiment of the present invention will be described with reference to FIGS. 4 and 5.

In the second embodiment, as the oil temperature automatic-control mechanism of the viscous heater 6, a bimetal 66 which opens the oil outlet 57 when the temperature of the viscous fluid is more than a predetermined high temperature (e,g., 200° C.) and a bimetal 67 which opens the oil inlet 58 when the temperature of the viscous fluid is less than a predetermined low temperature (e.g., 100° C.) are respectively attached at the oil outlet 57 and the oil inlet 58.

Figure 5A:
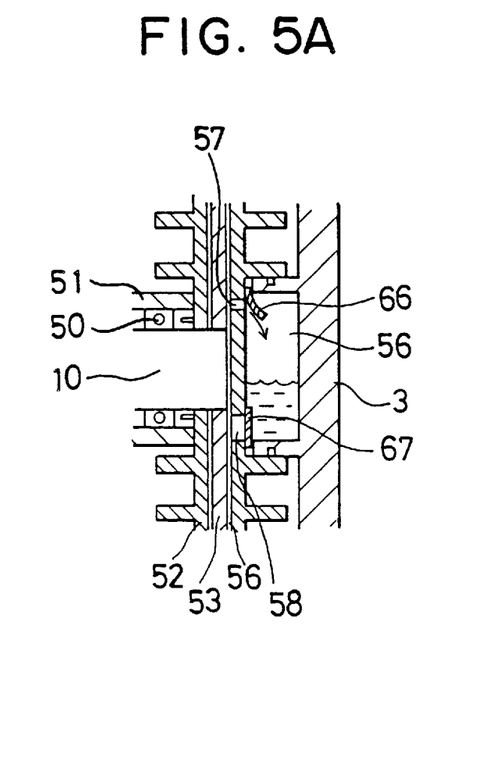
FIGS. 5A and 5B are diagrammatic views showing operation states of an oil temperature automatic-control mechanism according to the second embodiment.
Figure 5B:
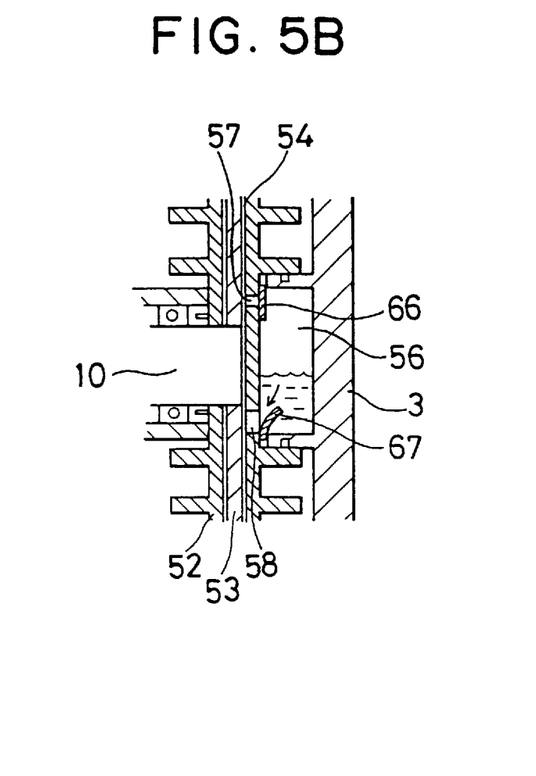

In the second embodiment, when the rotor 53 of the viscous heater 6 rotates in a high speed so that the viscous fluid in the heat-generating chamber 54 has a high temperature, the bimetal 66 opens the oil outlet 57 as shown in FIG. 5A, and therefore the viscous fluid in the heat-generating chamber 54 flows into the oil storage chamber 56. When the temperature of the viscous fluid in the oil storage chamber 56 is decreased by natural cooling, the bimetal 67 opens the oil inlet 58 as shown in FIG. 5B, and therefore the viscous fluid in the oil storage chamber 56 returns to the heat-generating chamber 54. Thus, oxidation and deterioration of the viscous fluid in the heat-generating chamber 54 can be prevented.

Figure 6:
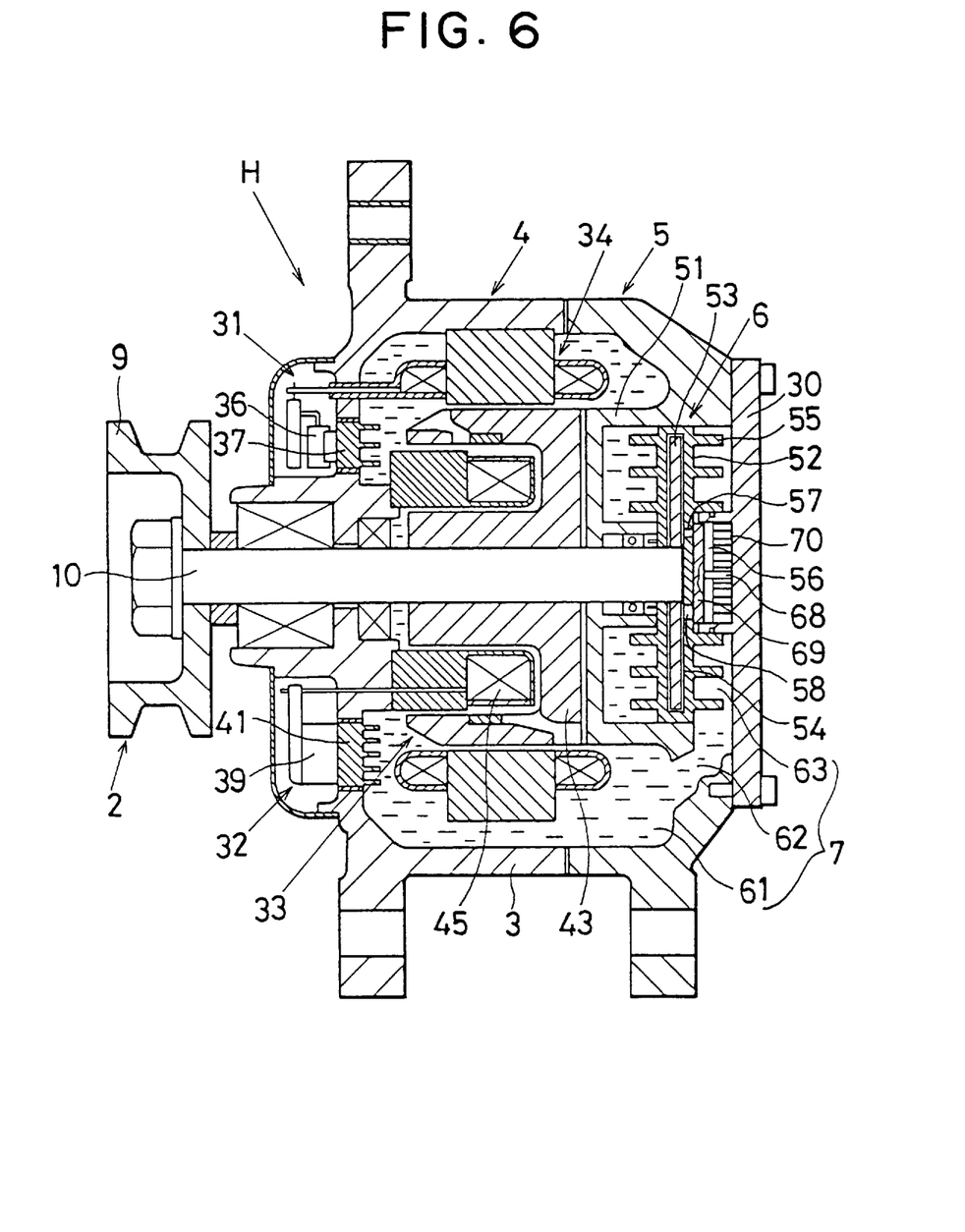
FIG. 6 is a cross-sectional view showing a supplementary heating source unit for heating according to a third preferred embodiment of the present invention.

A third preferred embodiment of the present invention will be described with reference to FIGS. 6 and 7.

In the third embodiment, as the oil temperature automatic-control mechanism of the viscous heater 6, a rotary valve 69 made of aluminum alloy and a spiral type plate spring shaped bimetal 70 for driving the rotary valve 69 are disposed in the oil storage chamber 56 of the viscous heater 6. The rotary valve 69 rotates around a supporting rod 68. A circular arc-shaped window portion 71 for selectively opening and closing the oil outlet 57 or oil inlet 58 of the casing 52 is formed in the rotary valve 69.

Figure 7A:
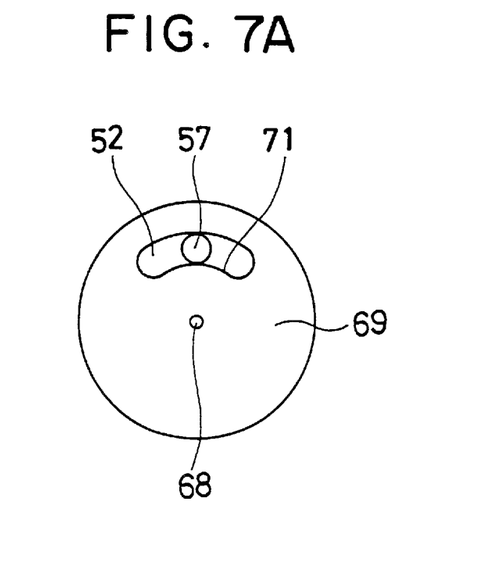
FIGS. 7A and 7B are diagrammatic views showing operation states of an oil temperature automatic-control mechanism according to the third embodiment.
Figure 7B:
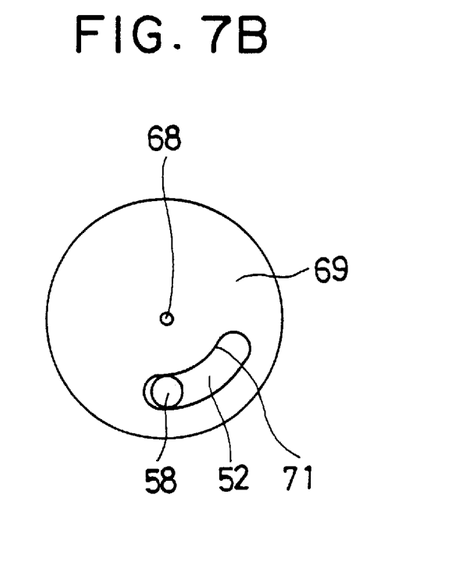

When a temperature around the bimetal 70 (including the oil temperature of the viscous fluid) becomes high, the bimetal 70 drives the rotary valve 69 so that the window 71 corresponds to the oil outlet 57 as shown in FIG. 7A, and therefore the viscous fluid in the heat-generating chamber 54 flows in the oil storage chamber 56. When the temperature of the viscous fluid in the oil storage chamber 56 becomes lower by natural cooling so as to decrease the temperature around the bimetal 70, the bimetal 70 returns the rotary valve 69 so that the window portion 71 corresponds to the oil inlet 58, and therefore the viscous fluid in the oil storage chamber 56 returns to the heat-generating chamber 54. Thus, the oxidation and the deterioration of the viscous fluid in the heat-generating chamber 54 can be prevented.

Figure 8:
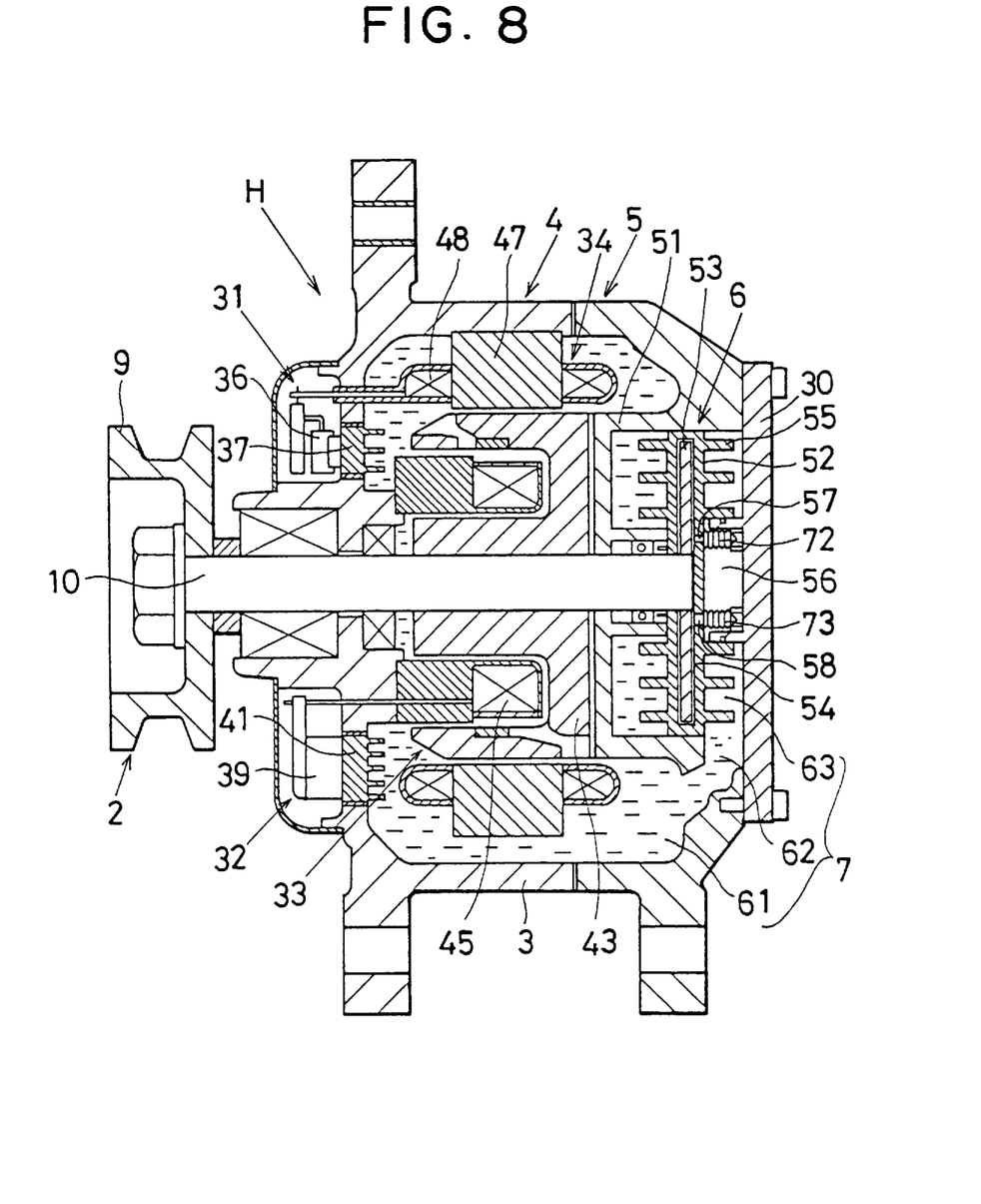
FIG. 8 is a cross-sectional view showing a supplementary heating source unit for heating according to a fourth preferred embodiment of the present invention.

A fourth preferred embodiment of the present invention will be described with reference to FIG. 8.

In the fourth embodiment, as the oil temperature automatic-control mechanism of the viscous heater 6, thermo-wax (i.e., temperature-responding type valve) 72 and 73 for selectively opening and closing the oil outlet 57 or the oil inlet 58 of the casing 52 according to the oil temperature of the viscous fluid are used instead of the bimetals 67 and 68 in the second embodiment.

Figure 9:
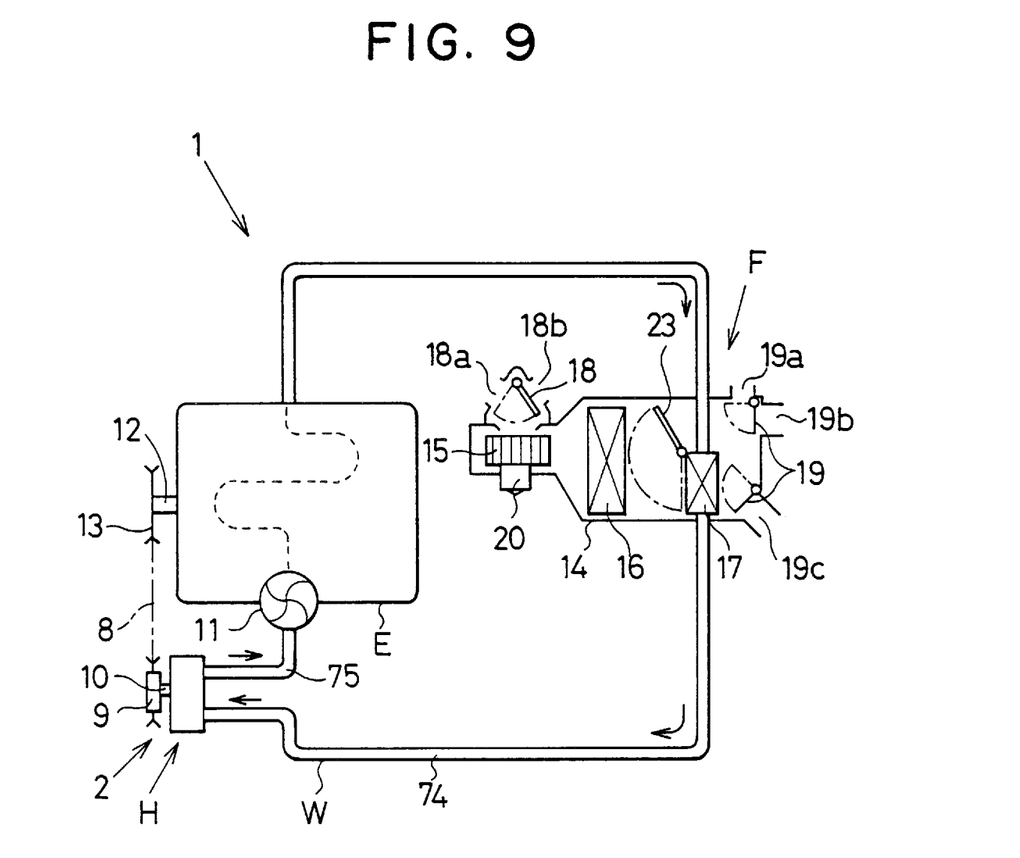
FIG. 9 is a schematic diagram showing an entire construction of an air-conditioning apparatus for a vehicle according to a fifth preferred embodiment of the present invention.

A fifth preferred embodiment of the present invention will be described with reference to FIG. 9.

In the above-described embodiments, the supplementary heating source unit H is disposed between the cooling water pipes 64 and 65 for supplying the cooling water from the engine E to the heater core 17. However, in the fifth embodiment, as shown in FIG. 9, the supplementary heating source unit H is disposed between the cooling water pipes 72 and 73 for supplying the cooling water from the heater core 17 to the engine E.

Although the present invention has been fully described in connection with preferred embodiments thereof with reference to the accompanying drawings, it is to be noted that various changes and modifications will become apparent to those skilled in the art.

For example, in the above-described embodiments, as a electric rotating machine, the alternator 4 connected to and rotated by the engine E is used. However, as the electric rotating machine, the other alternators rotated by an electric motor may be used.

In the above-described preferred embodiments, as the heating source and the driving source, the water-cooled engine E is used. However, a motor may be used as the heating source and the driving source.

In the above-described preferred 'embodiments,' as the electric device of the alternator 4, the plurality of diodes 36 of the three-phase rectifying device 31, the electric part 39 of the voltage regulator 32, the field coil 45 and the stator coil 48 are used; however, any one of the heat-generating parts may be used. Further, as the electric device, an electric motor, an electric compressor, diodes, semiconductor parts such as a transistor, a condenser, and electric parts such as coils and resistances may be used.

Such changes and modifications are to be understood as within the scope of the present invention as defined by the appended claims.

What is claimed is:

1. A rotating apparatus for a vehicle having a driving source unit and a passenger compartment, comprising:
    a heat-generating unit using a shearing force, said heat-generating unit including a rotor which rotates when a driving force of said driving source unit is applied thereto and a heat-generating chamber for sealing therein viscous fluid which generates heat for heating said passenger compartment when a shearing force generated by a rotational force of said rotor is applied to said viscous fluid;
    a rotating unit having a rotating body which is disposed coaxially with said rotor of said heat-generating unit and rotates when a driving force of said driving source unit is applied thereto, said rotating unit generating heat for heating said passenger compartment due to said rotation of said rotating body; and
    a driving force transmission unit having a common driving shaft for transmitting the driving force of said driving source unit to said rotor and said rotating body.

2. A rotating apparatus according to claim 1, wherein, said rotating body includes a rotor, and
    said rotating unit generates an electric power when the driving force of said driving source unit is applied to said rotor of said rotating unit through said common driving shaft.

3. A rotating apparatus according to claim 1, wherein, said driving source unit is a water-cooled engine, and
    said rotating unit is a water-cooled alternator.

4. A heating apparatus for heating a passenger compartment of a vehicle having a driving source unit, comprising:
    a heating heat exchanger for heating said passenger compartment by performing heat-exchange between thermal medium absorbing heat from a heating source and air to be blown into said passenger compartment;
    a heat-generating unit using a shearing force, said heat-generating unit including a rotor which rotates when a driving force of said driving source unit is applied thereto, a thermal medium passage in which said thermal medium flows, and a heat-generating chamber for sealing therein viscous fluid which generates heat for heating said thermal medium in said thermal medium passage when a shearing force generated by a rotational force of said rotor is applied to said viscous fluid;
    a thermal medium pipe for circulating said thermal medium between said heating source and said heating heat exchanger through said thermal medium passage; and
    a heat recovery unit having an electric device, which heats said thermal medium flowing in said thermal medium passage by heat generated with an operation of said electric device, wherein said thermal medium passage is a common passage relative to said heat-generating unit and said heat recovery unit.

5. A heating apparatus according to claim 4, wherein said thermal medium pipe is further for supplying said thermal medium from said heating source to said heating heat exchanger through said thermal medium passage.

6. A heating apparatus according to claim 4, wherein said thermal medium pipe is further for supplying said thermal medium from said heating heat exchanger to said heating source through said thermal medium passage.

7. A heating apparatus according to claim 4, wherein said electric device is an alternator.

8. A heating apparatus for heating a passenger compartment of a vehicle having a water-cooled engine, comprising:
    a heating heat exchanger for heating said passenger compartment by performing heat-exchange between cooling water absorbing heat from a heating source and air to be blown into said passenger compartment;
    a heat-generating unit using a shearing force, said heat-generating unit including a rotor which rotates when a driving force of said engine is applied thereto, a cooling water passage in which said cooling flows, and a heat-generating chamber for sealing therein viscous fluid which generates heat for heating said cooling water in said cooling water passage when a shearing force generated by a rotational force of said rotor is applied to said viscous fluid;
    a cooling water pipe for circulating said cooling water between said heating source and said heating heat exchanger through said cooling water passage; and
    a heat recovery unit having an electric device, which heats said cooling water flowing in said cooling water passage by heat generated with an operation of said electric device, wherein said cooling water passage is a common passage relative to said heat-generating unit and said heat recovery unit.

9. A heating apparatus according to claim 8, wherein said cooling water pipe is further for supplying said cooling water from said heating source to said heating heat exchanger through said cooling water passage.

10. A heating apparatus according to claim 8, wherein said cooling water pipe is further for supplying said cooling water from said heating heat exchanger to said heating source through said cooling water passage.

11. A heating apparatus according to claim 8, wherein said electric device is an alternator.

12. A heating apparatus according to claim 11, wherein, said alternator includes a rotor which rotates when the driving force of said engine is applied thereto, and
    said rotor of said alternator and said rotor of said heat-generating unit have a common driving shaft.

13. A heating apparatus according to claim 8, further comprising:
    a driving force transmission unit having a common driving shaft for transmitting the driving force of said engine to said rotor of said heat-generating unit and said electric device.

14. A heating apparatus according to claim 8, further comprising:

an oil temperature automatic-control mechanism for controlling a temperature of said viscous fluid in said heat-generating chamber.

15. A heating apparatus for heating thermal medium circulating in a thermal medium circuit, said heating apparatus comprising:

a heat-generating unit using a shearing force, said heat-generating unit including a rotor which rotates when a driving force of a driving source unit is applied thereto, a thermal medium passage in which said thermal medium in said thermal medium circuit flows, and a heat-generating chamber for sealing therein viscous fluid which generates heat for heating said thermal medium in said thermal medium passage when a shearing force generated by a rotational force of said rotor is applied to said viscous fluid; and a heat recovery unit having an electric device, which heats said thermal medium flowing through said thermal medium passage by heat generated with an operation of said electric device, wherein said thermal passage is a common passage relative to said heat-generating unit and said heat recovery unit.

16. A heating apparatus according to claim 15, wherein said electric device is an alternator.

17. A heating apparatus according to claim 16, wherein:

said alternator includes a rotor which rotates when the driving force of said driving source unit is applied thereto; and said rotor of said alternator and said rotor of said heat-generating unit have a common driving shaft.

* * * * *

UNITED STATES PATENT AND TRADEMARK OFFICE
CERTIFICATE OF CORRECTION

PATENT NO. : 5,836,270

DATED : November 17, 1998

INVENTOR(S) : Shinji Aoki et al

It is certified that error appears in the above-identified patent and that said Letters Patent is hereby corrected as shown below:

Title Page, [75] Inventors, "Shiniji" should be --Shinji--

Col. 1, line 32, delete "with" & substitute --in the-- therefor

Col. 2, line 58, delete 1st occurrence of "a"

Col. 2, line 60, delete "a"

Col. 4, line 11, delete "control" & substitute --controlling-- therefor

Col. 5, line 53, delete "a" & substitute --an-- therefor

Col. 5, line 64, delete "an" & substitute --a-- therefor

Col. 5, line 67, delete 2nd "a" & substitute --an-- therefor

Col. 6, line 10, delete "an" & substitute --a-- therefor

Col. 6, line 13, delete "pare" & substitute --pair-- therefor

Col. 6, line 53, delete "25"

Col. 8, line 7, after "cycle," insert --and--

Col. 8, line 27, delete "absorb" & substitute --absorbs-- therefor

UNITED STATES PATENT AND TRADEMARK OFFICE
CERTIFICATE OF CORRECTION

PATENT NO. : 5,836,270
DATED : November 17, 1998
INVENTOR(S) : Shinji Aoki et al It is certified that error appears in the above-identified patent and that said Letters Patent is hereby corrected as shown below:

Col. 8, line 30, delete "parts" & substitute --part-- therefor

Col. 9, line 47, delete "with" & substitute --in the-- therefor

Col. 10, line 3, delete "e,g.," & substitute --e.g.,-- therefor

Col. 10, line 33, after "window" insert --portion--

Col. 11, line 12, delete quotation marks from "'embodiment,'"

Col. 12, line 32, claim 8, after "cooling" insert --water--

Signed and Sealed this

Fourth Day of May, 1999

Q. TODD DICKINSON

*Attest:*

*Attesting Officer*      Acting Commissioner of Patents and Trademarks